United States Patent [19]

Miller et al.

[11] 4,150,325
[45] Apr. 17, 1979

[54] POWER CONVERSION SYSTEM HAVING INVERSION FAULT DETECTION AND CORRECTION CIRCUIT

[75] Inventors: Richard W. Miller, Salem; Danny O. Wright, Newport News, both of Va.

[73] Assignee: General Electric Company, Salem, Va.

[21] Appl. No.: 856,931

[22] Filed: Dec. 2, 1977

[51] Int. Cl.² .......................................... H02K 23/66
[52] U.S. Cl. .................................... 318/434; 363/54; 363/81; 363/87; 318/506
[58] Field of Search ............... 318/345 C, 345 G, 434, 318/506; 363/52–54, 79, 81, 84, 85, 87, 129

[56] References Cited

U.S. PATENT DOCUMENTS

| | | | |
|---|---|---|---|
| 3,413,534 | 11/1968 | Stringer | 318/345 C X |
| 3,526,819 | 9/1970 | Graf | 318/434 X |
| 4,016,468 | 4/1977 | Graf | 318/434 |

*Primary Examiner*—William M. Shoop
*Attorney, Agent, or Firm*—Arnold E. Renner

[57] ABSTRACT

A system, for supplying electrical power from a source to a load, of the type employing phase controlled rectifiers for controlling the power from a polyphase source to the load includes circuitry to detect the existence of a rectifier which is conducting at an improper time and to provide appropriate corrective action to terminate such improper conduction.

16 Claims, 3 Drawing Figures

POWER CONVERSION SYSTEM HAVING INVERSION FAULT DETECTION AND CORRECTION CIRCUIT

BACKGROUND OF THE INVENTION

The present invention relates generally to fault detection and correction in an alternating current (a.c.) to direct current (d.c.) conversion system. More particularly this invention relates to the detection of an improperly conducting controlled rectifier within a bridge circuit utilized to supply a d.c. load, for example a motor, with power from an a.c. source and to means for correcting or rendering nonconductive such improperly conducting rectifier. The present invention, although generally applicable to such systems, is particularly applicable to conversion systems employing digital type firing systems.

It is well known in the art to provide a system for the conversion of a.c. to d.c. using a full wave rectification bridge employing a plurality of controlled rectifiers which, at the present time, are usually thyristors of the type known as silicon controlled rectifiers (SCRs). It is also well known that whether the system be single phase or polyphase, the value of the d.c. voltage at the output of the rectifying bridge can be varied by controlling the phase firing angle of the individual bridge rectifiers. Phase angle control, as is well understood in the art, means that the individual rectifiers are fired at controllable times within the applied voltage cycle such that they are conductive only for a portion of the cycle. The use of such bridge circuits for the control of d.c. motors is also well known in the art and such systems normally employ a variety of feedback and control circuits to adjust the phase firing angle of the rectifier bridge so as to control motor operation through the control of the voltage applied to the motor. An example of such a system employing a current limit feature in an analog mode is shown and described in U.S. Pat. No. 3,526,819, "Current Limit For Motor Control Systems" by C. E. Graf issued Sept. 1, 1970. An example of a digital type of bridge control circuit may be found in U.S. patent application Ser. No. 927,795, filed July 25, 1978, "Power Converter Control" by W. B. Jarvinen which is a continuing application of Ser. No. 743,863, filed Nov. 22, 1976 (now abandoned). Both the patent and the application are assigned to the assignee of the present invention and are specifically incorporated hereinto by reference.

Controlled rectifier power conversion systems such as are here being discussed are susceptible to what are known as d.c. faults or "shoot-throughs". This is particularly true when the power conversion system supplies power to a motor and the motor is operating in the regenerative mode. A d.c. fault occurs when one or more of the rectifiers of the bridge are conducting at a time when they should be nonconducting. These faults or shoot-throughs may result from a variety of reasons including the failure of a particular rectifier to fire or conduct at its appointed time because of an intermittent faulty rectifier firing circuit connector or firing control. It may also be the result of the failure of one rectifier to commutate off its predecessor due to excessive current or lack of sufficient volt seconds due, for example, to a.c. supply line voltage reduction. Other possible causes include the false firing of one rectifier in the same a.c. supply phase as a rectifier properly fired due to excessive anode to cathode change of voltage with respect to time and electrical noise coupled into the firing circuit associated with the rectifiers. Regardless of the cause of the d.c. fault or shoot-through, the end result may be fuse failure and sudden shutdown of the drive or in a more exaggerated case the excessive currents may cause damage to the motor, if the motor is not otherwise protected.

SUMMARY OF THE INVENTION

It is, therefore, an object of the present invention to provide a power conversion system having improved means for the detection and correction of a d.c. fault.

It is a further object to provide an improved means for the detection and correction of a d.c. fault in a motor control system.

It is another object to provide, in a motor control system, improved means for detecting improper conduction of a controlled rectifier in a supply bridge and for providing corrective action with respect thereto.

It is a further object to detect the failure of a controlled rectifier in a supply bridge to properly commutate and to force the commutation of that rectifier by the earlier than normal firing of the next scheduled to fire rectifier.

It is a still further object, in a polyphase a.c. supply system employing line commutating control rectifiers in which a first control rectifier is commutated by the firing of a second rectifier, to provide improved means for the detection and correction of the failure of the first of the rectifiers to properly commutate.

It is a still further object to provide, in a polyphase a.c. supply system employing commutated controlled rectifiers, a means to detect and correct for an improperly conducting rectifier, which system is particularly adaptable for use in either an analog or a digital thyristor firing control type of system.

It is recognized that, in the case of a d.c. fault, the d.c. current will rise rapidly while the a.c. current will decrease toward zero. As such the most straight forward approach to the recognition of a fault would be to measure both the a.c. phase currents and the d.c. load current and to compare them. The accurate detection of a d.c. current magnitude, however, is difficult and expensive. Accordingly, the above objects are achieved in accordance with the present invention by providing suitable circuitry and means for simultaneously detecting the occurrence of (1) a load terminal voltage which has a steady-state value of approximately 0 volts; (2) an a.c. supply current which is at some value other than zero; and, (3) a determination that the last thyristor firing of the bridge was of a minimum prescribed angle. Simultaneous occurrence of the three above-listed criteria indicates a d.c. fault or the improper conduction of a controlled rectifier within the bridge and this simultaneous occurrence is utilized to provide a suitable signal which in turn is employed to cause an advance in the firing angle of the next to be fired rectifier of the bridge to a specific angle so as to render that rectifier conductive and commutate off the rectifier which is improperly conducting.

BRIEF DESCRIPTION OF THE DRAWING

While the claims annexed to and forming a part of this specification particularly point out and describe what is the present invention, a better understanding can be had by reference to the following detailed description taken in conjunction with the accompanying drawings in which:

DETAILED DESCRIPTION

Figure 1:
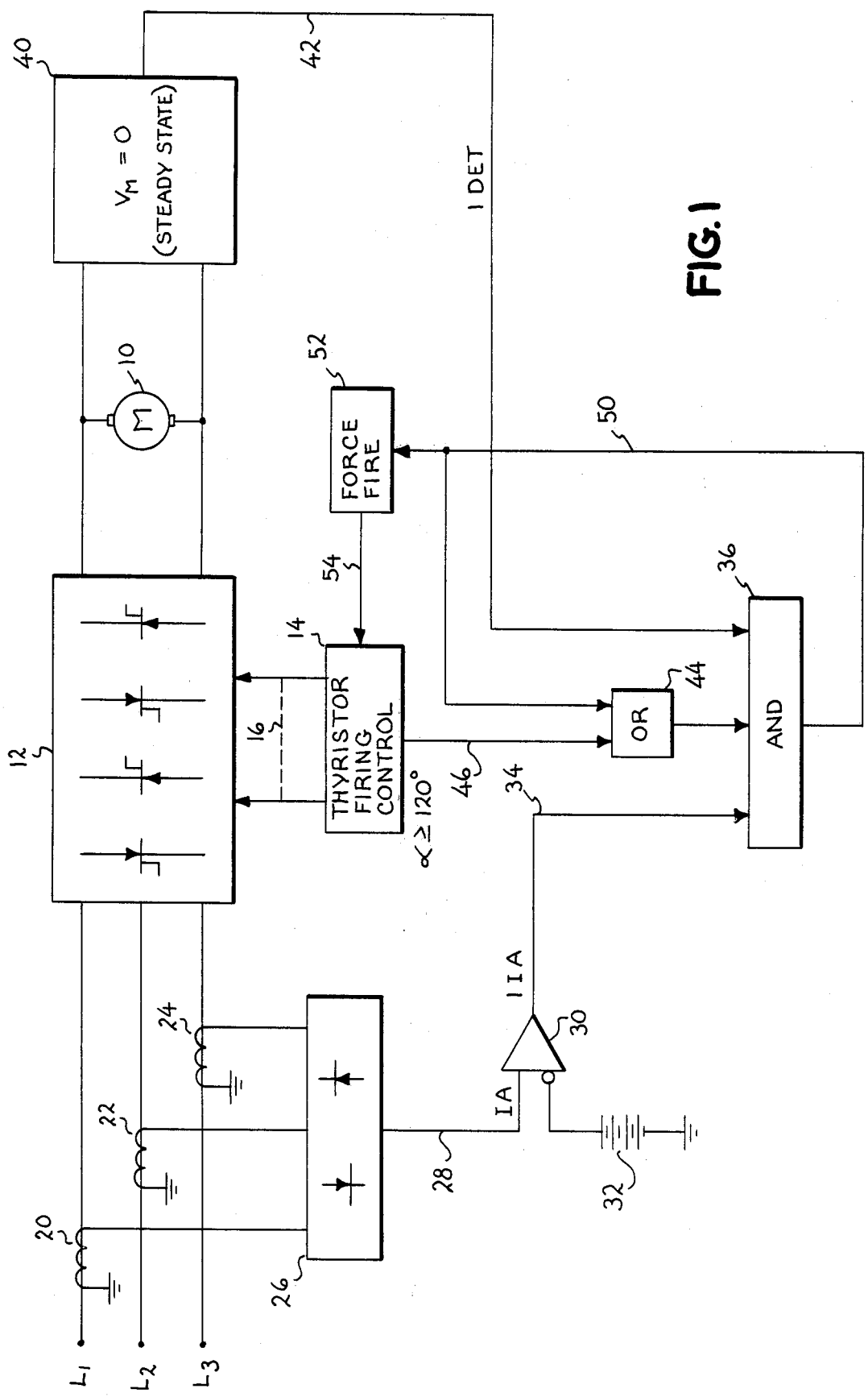
FIG. 1 is a major block diagram showing the overall system embodying the present invention in its preferred embodiment.

Referring now to FIG. 1, a load depicted as a d.c. motor 10 is provided with variable d.c. power from a three phase source illustrated by the lines $L_1$, $L_2$ and $L_3$ by way of a conventional, phase controlled, full wave rectifying bridge shown generally within the block 12. As is well known in the art, bridge 12 may be comprised of 12 thyristors, six of which are operative to drive the motor in the forward direction and six of which operate when the motor is operated in the reverse direction. The use of six SCRs in each direction provides the ability of regenerative motor operation all as is well known in the art. Each of the thyristors of SCRs within the bridge 12 is inclusive of an anode and cathode and a gate electrode to which there is applied, at an appropriate time, a gating signal from a thyristor firing control 14 by way of one of a plurality of gating lines 16. In that there are 12 rectifiers in the bridge, there would be 12 gating lines. Bridges of this nature are well known as are various control apparatus for controlling the SCRs to the bridge and further explanation of the bridge 12 and the firing control 14 is believed unnecessary as the exact details of these are not critical to the present invention.

Still with reference to FIG. 1, three feedback paths are provided to generate the desired signals for the operation of the present invention. The first of these feedback signals is one which is proportional to the a.c. current. To this end, there are provided three current transformers 20, 22 and 24 associated, respectively, with the lines $L_1$, $L_2$ and $L_3$. Each of the transformers provides a signal to a full wave rectification bridge, illustrated by the block 26, which provides an output signal IA on line 28. Signal IA will have a value proportional to the a.c. current in the lines connecting the terminals $L_1$, $L_2$ and $L_3$ to the bridge 12. In that the present invention is particularly adaptable for use in a digital type system, the signal IA is converted to a digital level by being applied to the noninverting input of a comparator amplifier 30 the inverting input of which is connected to a suitable bias voltage, illustrated as a battery 32 having its negative terminal connected to ground. The output of the amplifier 30, designated 1IA (line 34) is applied as one input to a multiple input AND gate 36. Amplifier 30 works in a threshhold mode such that when the value of the signal IA exceeds the threshhold value established by the bias 32, the digital level output signal 1IA on line 34 is provided. The value of the bias supplied by the battery 32 will depend upon the individual needs of the system but it would normally be fairly low and only of sufficient magnitude to prevent the issuance of the 1IA signal based upon line noise, transients, etc. The second feedback is a voltage feedback and it is seen that connected across the terminals of the motor 10 is a block 40 labeled "$V_m = 0$ (Steady State)". Block 40 outputs a signal on line 42 which signal is called 1DET and serves as the second input to the AND gate 36. This signal is high, or is a binary 1, when the motor terminal voltage is equal substantially to zero and is not changing at a predetermined specified rate as will be fully explained with respect to FIG. 2.

Figure 3:
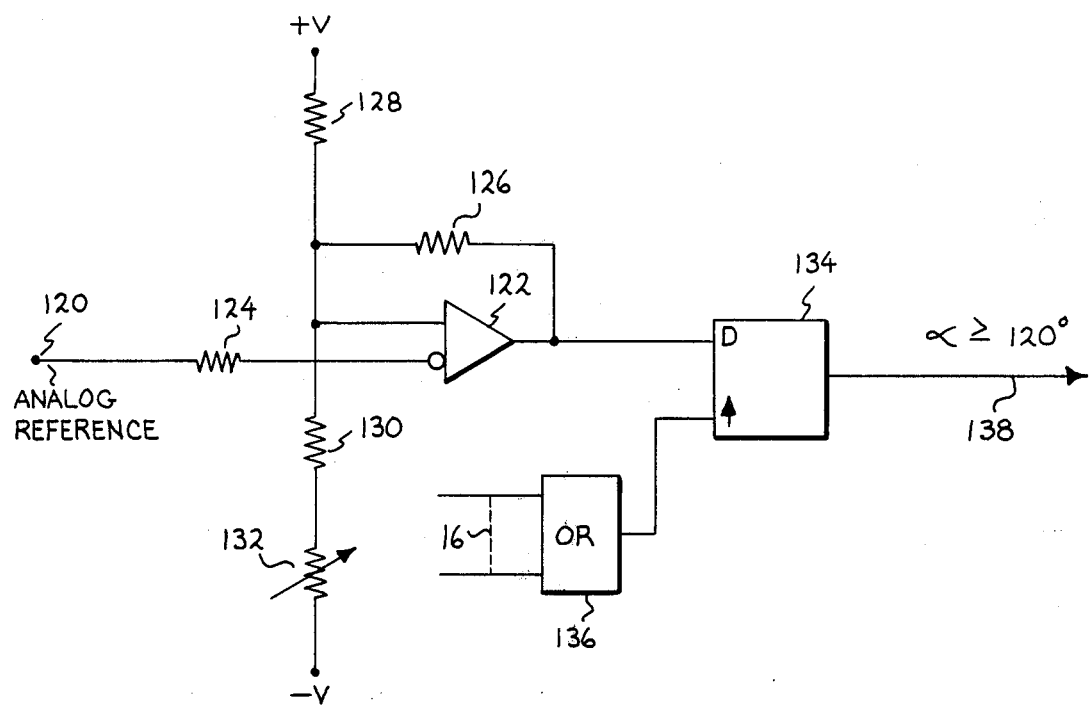

The third input to the AND gate 36 is the output of an OR gate 44, the first input of which is the output of the AND gate 36. The second input is from a line 46 which is derived from the thyristor firing control and is labeled $\alpha \geq 120°$. This signal indicates that the last thyristor fired was fired at an $\alpha$ angle of 120° or greater. In accordance with standard practice, the $\alpha$ angle is measured from the positive crossover of two phases of the source voltage. The actual means by which this signal is derived is not important to the present invention. For example, in the system of the aforementioned patent application Ser. No. 927,795 there exists a signal which is designated as "SA 120°". This signal is present, by nature of the firing circuit described in the application, each time the firing angle for a thyristor is 120° or greater. If the thyristor firing control were of an analog nature such as might be found in the aforementioned U.S. Pat. No. 3,526,819, then suitable circuitry designating the 120° level could be provided. Circuitry to provide such a signal is relatively simple and an example of such a circuit is shown by FIG. 3 which will be described hereinafter. It is also to be recognized that the particular value of 120° is arbitrary to a point and has been selected as a point where the phase angle retardation is such that a d.c. fault can be corrected by advancing the firing of the next to fire SCR. When each of the inputs to the AND gate is positive, that is, when the signal 1IA, 1DET and $\alpha \geq 120°$ are all binary 1's, AND gate 36 will be enabled. Once enabled it will remain enabled even though the firing angle $\alpha$ drops so long as the other two signals are present.

The output of the AND gate 36 is also applied by way of line 50 to a block 52 labeled Force Fire. In response to the signal on line 50, the Force Fire in block 52 will output a signal via line 54 to the thyristor firing control 14 to effect the firing of the next scheduled to fire thyristor within the bridge 12. The nature of the signal 54 and its affect on the thyristor control 14 will, of course, depend upon the type of firing control represented by the block 14. For example, in the digital system of the aforementioned application Ser. No. 927,795, the Force Fire would provide to the thyristor firing control what is, in that application, termed as a strapped input designating a firing angle of 90 electrical degrees (90°). The 90° figure is arbitrarily selected and is one which when compared with the 120° firing angle necessary to generate the force firing situation is sufficiently advanced therefrom (by 30°) to effect a satisfactory firing or correction in most instances of the d.c. fault. In the event of an analog type system, the Force Fire output on line 54 would be one which is in keeping with that system and which is designed to provide suitable force firing or earlier firing of the next scheduled thyristor. For example, in this case the signal might be a voltage signal having a magnitude recognizable by the firing control as designating a prescribed firing angle (e.g.; 90°).

Figure 2:
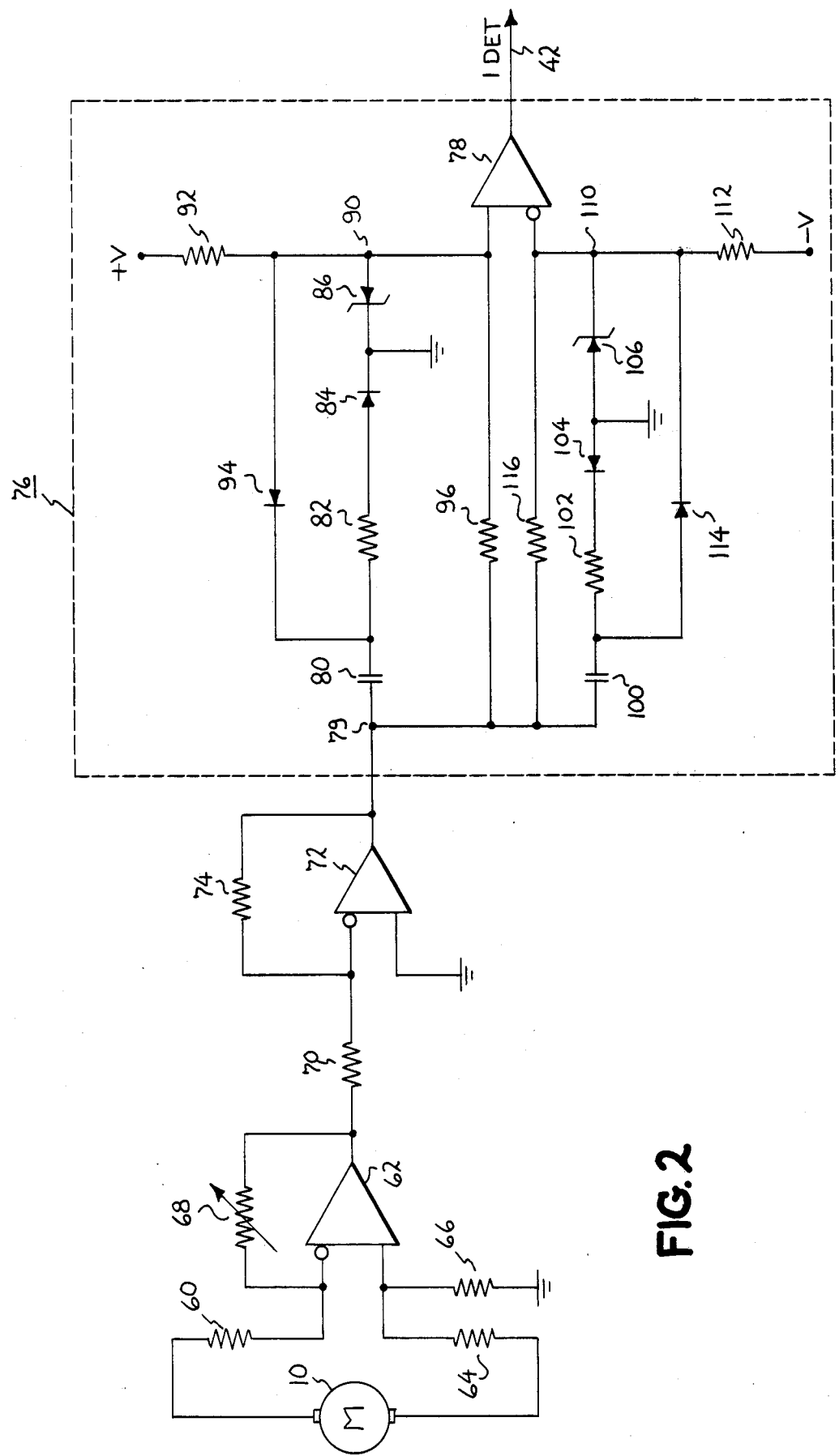
FIG. 2 is a schematic drawing showing in detail a portion of the circuit shown in FIG. 1 in block form; and, FIG. 3 is a schematic drawing illustrating one method of generating a key signal employed in the system shown in FIG. 1.

Referencing now FIG. 2, there is shown in detail the circuitry which comprises block 40 shown in FIG. 1. Also included, for purposes of orientation is the motor 10. In FIG. 1, block 40 is shown connected across the terminals of the motor 10. Correspondingly, in FIG. 2 the upper terminal of motor 10 is connected by way of an input resistor 60 to the inverting input of an operational amplifier 62. The lower terminal of motor 10 is connected to the noninverting input of amplifier 62 by way of an input resistor 64 and the noninverting input is also connected to ground by way of a resistor 66. A feedback resistor 68 which is shown variable in this particular instance is connected between the output and the inverting input of the amplifier 62. Amplifier 62 acts as a differential amplifier whose gain is variable in accordance with the setting of the resistor 68 to provide, at the output of the amplifier 62, a signal when the voltage across the motor terminals is other than zero. The output signal from operational amplifier 62 is applied by way of an input resistor 70 to the inverting input of a second operational amplifier 72 which has its noninverting input connected to ground and which further includes a resistor 74 connected between its output and its inverting input. Operational amplifier 72, by virtue of the values of the two resistors 70 and 74 (for example, 74 may be approximately ten times as large as 70), acts as a saturation inverter such that the output will be of a fixed value; e.g., ±10 volts, in accordance with a minimum value input signal (for example, 1 volt input either positive or negative).

The output of the saturating inverter operational amplifier 72 is connected as an input to the circuitry shown within the dashed line block 76 which collectively acts as a differentiating circuit with an output which is the 1DET signal earlier discussed. As previously indicated, the output of block 76 on line 42 will be at a binary 0 at all times excepting when the input to the block 76 is zero and, as will be better understood as this description proceeds, when the value of the input signal is not changing at a minimum prescribed rate. Looking first to the physical structure of block 76, there is an amplifier 78 which is connected for a comparison mode of operation and which has its inverting and noninverting inputs each connected to the output of operational amplifier 72 (junction 79) by means of an input circuit. With respect to the noninverting input to the comparator amplifier 78, a series arrangement of a capacitor 80, a resistor 82, a diode 84 and a zener diode is connected between junction 79 and a junction point 90 which is also the noninverting input to the comparator amplifier 78. The two diodes are connected cathode to cathode and this common point is further connected to ground. Point 90 is biased positive by virtue of its connection to a positive bias voltage +V by way of a resistor 92. A diode 94 has its anode connected to point 90 and its cathode connected to the junction of the capacitor 80 and resistor 82. A further resistor 96 is connected between junction 90 and junction 79. Similar input circuitry is connected between the junction 79 and the inverting input of the comparator 78 (junction 110). The primary difference between the two circuits is that the bias voltage in this instance is a negative voltage (−V) and that the direction of the three diodes is reversed. Specifically, as shown in FIG. 2, a capacitor 100 is connected in a series with a resistor 102 with the free end of the resistor being connected to the cathode of a diode 104 the anode of which is connected to ground with the ground point also being connected to the anode of a zener diode 106 which has its cathode connected to point 110. Point 110 is biased negative by virtue of being connected to a negative bias voltage (−V) by way of a resistor 112. Junction 110 is further connected to the cathode of a diode 114 which has its anode connected to the junction of the capacitor 100 and the resistor 102 and there is further provided a resistor 106 connected between junction 110 and the input junction 79.

The operation of the circuitry within block 76 is substantially as follows. It will be remembered that amplifier 72 is stated to be a saturation inverter such that its output, in response to any input other than substantially zero will be either plus or minus some value (in the example given, 10 volts). With a zero input, the value of the output of the amplifier 72 will be zero. When amplifier 72 is in positive saturation, junction 110 is at saturation voltage times the ratio of the two resistors 112 and 116. Junction 90 will be one diode voltage drop (approximately +0.7 volts) above ground by virtue of the fact that the zener diode 86 is forward biased and conducting in the forward direction to ground. As such, the output of the comparator amplifier 78 will be a binary 0. Conversely, if the output of the amplifier 72 is in negative saturation, then junction 90 will be at positive saturation times the ratio of the resistors 92 and 96 and junction 110 will be at a voltage corresponding to one voltage drop negative below ground. In this case, the output of the comparator is again zero. If the output of amplifier 70 is at 0 volts, and this is a steady-state situation, junction 90 will be at a positive diode drop above ground while junction 110 will be at a negative drop below ground and the output of the comparator 78 will be a binary 1 indicating that there is a zero voltage condition across the motor terminals.

In order that there not be an erroneous fault detected each time the motor terminal voltage goes through a zero voltage condition transiently as, for example, when there is a direction change in the voltage applied to the motor, the rest of the circuitry of block 76 is provided. If it is now assumed that the voltage output of amplifier 72 is changing at a rate which is sufficient to indicate an actual change in motor operation and not a d.c. fault, the changing voltage seen at junction 79 will, in effect, make each of the capacitors 80 and 100 look like short circuits. If the voltage is positive and changing, diode 94 will be back biased and diode 114 will be conducting. Conversely, when the voltage at point 79 goes negative, diode 114 is back biased and diode 94 is conducting. In both cases, however, junction 90 is at a higher voltage than is junction 110 and therefore the comparator output 78 is a binary 0. In the specific embodiment in which this invention is actually implemented, the several components of the circuit within 76 were selected to provide that with a rate of change in excess of 2.2 volts per millisecond the action just described would occur.

Summarizing the function of block 76, it is seen that the output thereof (1DET) will be a binary 1 thus acting to enable AND gate 36 in FIG. 1 only when the input to the block is a steady-state zero. At all other times, 1DET will be a binary 0 thus disabling AND gate 36.

As earlier indicated, while the present invention is particularly suited for digital type of thyristor firing controls where a digital angle signal is readily available, it is also entirely suitable for analog type systems. In a typical analog system the only showing of FIG. 1 not readily available is the signal $\alpha \geq 120°$ on line 46. In an analog system, however, the signal controlling the firing of the bridge thyristors normally has a value proportional to the firing angle. As such, the development of the equivalent of the $\alpha \geq 120°$ signal in a digital system is easily obtained and one possible circuit for achieving this result is shown in FIG. 3.

In FIG. 3, a signal designated "Analog Reference" is shown applied to an input terminal 120. This reference would be some signal indicating a desired level of bridge operation and could, if the system were of the type shown in the aforementioned U.S. Pat. No. 3,526,819, be the signal delivered by the "Command source" 24 of the patent showing. This reference signal is applied, by way of an input resistor 124, to the inverting input of an operational amplifier 122 which is connected in the comparison mode of operation. The noninverting input of amplifier 122 is connected to its output by way of a feedback resistor 126. The noninverting input is biased by being connected to an intermediate point of a voltage divider comprised of three series resistors 128, 130 and 132 which divider is connected between voltage sources +V and −V. Resistor 132 is shown variable so that biasing on this input is adjustable. By proper selection of component and voltage values with respect to the value of the signals received at terminal 120, the output of amplifier 122 will be, for example, at a positive value only when the analog reference is of a value sufficient to effect a prescribed level of bridge operation. In the example here being employed, that level would correspond to a firing angle of 120° or more. To convert the signal from amplifier 122 to a digital signal and to relate that digital signal to the firing of the thyristors, the output of amplifier 122 is connected to the data (D) terminal of a trigger flip-flop 134. The trigger terminal of the flip-flop receives a signal from an OR gate 136 the inputs of which are the twelve gating signals on lines 16. Thus, the output of flip-flop 134 (line 136) will reflect the binary condition of the output of amplifier 122 at the time of the last rectifier firing. To correspond with the illustration of this description, the signal on line 138 is labeled $\alpha \geq 120°$.

From the foregoing, the three criteria set forth for detection of a d.c. fault have been satisfied and it is seen that there has been provided a circuit which will reliably perform and which is readily adapted to digital and analog types of systems.

While there have been shown and described what are at present considered to be the preferred embodiments of the present invention, modifications thereto will readily occur to those skilled in the art. It is not desired, therefore, that the invention be limited to the specific circuit shown and described and it is intended to cover in the appended claims all such modifications as fall within the true spirit and scope of the invention.

What is claimed is:

1. In a system of the type in which a d.c. load is supplied power from an a.c. source by way of a rectifier bridge, the individual rectifiers of which are rendered conductive in a prescribed sequence and at controllable times, means for detecting the existence of an improperly conducting rectifier and for providing remedial action with respect thereto comprising:
   (a) means for developing a first signal indicative of a steady-state load terminal voltage equal to approximately zero volts;
   (b) means for developing a second signal indicative of an alternating current being supplied to the bridge;
   (c) means for developing a third signal indicative of a last thyristor firing at a minimum prescribed angle; and,
   (d) means responsive to said first, second and third signals to effect a prescribed forced angle of rendering conductive at least a prescribed one of said rectifiers of said bridge.

2. The invention in accordance with claim 1 wherein the source is a polyphase a.c. source and wherein the means for developing said second signal is responsive to the current in a plurality of lines connecting the source and the bridge.

3. The invention in accordance with claim 1 wherein said minimum prescribed angle is equal to approximately 120 electrical degrees.

4. The invention in accordance with claim 1 wherein said prescribed forced angle is approximately 90 electrical degrees.

5. The invention in accordance with claim 1 wherein said means to develop said first signal includes means to output a signal proportional to the instantaneous terminal voltage of said load and further includes means to inhibit the development of said first signal when the load terminal voltage is approximately zero and is changing at a rate of at least a prescribed amount.

6. The invention in accordance with claim 6 wherein the said prescribed rate is approximately 2.2 volts per millisecond.

7. The invention in accordance with claim 1 wheren the d.c. load is a d.c. motor and wherein said load terminal voltage is the motor terminal voltage.

8. The invention in accordance with claim 7 wherein said means to develop said first signal includes means to output a signal proportional to the instantaneous terminal voltage of the motor and further includes means to inhibit the development of said first signal when the terminal voltage is approximately zero and is changing at a rate of at least a prescribed amount.

9. A system for the control of a d.c. motor supplied from an a.c. source comprising:
   (a) a power conversion unit for supplying power to the motor from the source in which a plurality of controlled rectifiers are sequentially rendered conductive at controlled times in response to prescribed motor operating parameters; and
   (b) means for detecting the existence of an improperly conducting rectifier and providing remedial action with respect thereto including,
      (1) means for developing a first signal indicative of a steady-state motor terminal voltage equal to approximately zero volts;
      (2) means for developing a second signal indicative of an alternating current being supplied to said bridge;
      (3) means for developing a third signal indicative of a last thyristor firing of a minimum prescribed angle; and,
      (4) means responsive to said first, second and third signals to effect a prescribed forced angle of rendering conductive at least a prescribed one of said rectifiers of said bridge.

10. The invention in accordance with claim 9 wherein said power conversion unit constitutes a full wave, reversing, regenerative bridge.

11. The invention in accordance with claim 9 wherein said minimum prescribed angle is equal to approximately 120 electrical degrees.

12. The invention in accordance with claim 9 wherein said prescribed forced angle is approximately 90 electrical degrees.

13. In a control system of the type in which a d.c. load is supplied with electrical power from an a.c. source by way of a rectifier bridge, the individual rectifiers of which are rendered conductive in a prescribed sequence and at controlled times, means for detecting the existence of an improperly conducting rectifier and for providing remedial action with respect thereto comprising:

(a) means responsive to the terminal voltage of said load for developing a first signal when the terminal voltage is substantially zero and is not changing at a rate higher than a prescribed value;
(b) means responsive to the alternating current supplied from the source to the load for developing a second signal only when such load current exists;
(c) means responsive to the firing of the rectifiers of the bridge to provide a third signal designating a last fired rectifier firing angle of at least a prescribed value; and,
(d) means responsive to the first, second and third signals to effect a prescribed forced angle of rendering conductive at least a one of said rectifiers of said bridge.

14. The invention in accordance with claim 13 wherein said load is a d.c. motor and said first means is responsive to the motor terminal voltage.

15. The invention in accordance with claim 13 wherein said last recited means once operative remains operative without the presence of said third signal.

16. The invention in accordance with claim 13 wherein the means responsive to the d.c. motor terminal voltage includes amplifier means to provide an output signal having a given absolute value when a terminal voltage other than zero exists and a substantially zero value when the motor terminal voltage is substantially zero and further including differentiating means for providing said third signal at all times when said output signal is substantially zero excepting if the value of the output signal is changing at a minimum prescribed rate.

* * * * *